Dec. 21, 1948.　　　G. L. SIMARD ET AL　　　2,457,092
METHOD AND APPARATUS FOR PRODUCING
ELECTRON DIFFRACTION SPECTRA
Filed April 17, 1945　　　　　　　　　　　2 Sheets-Sheet 2
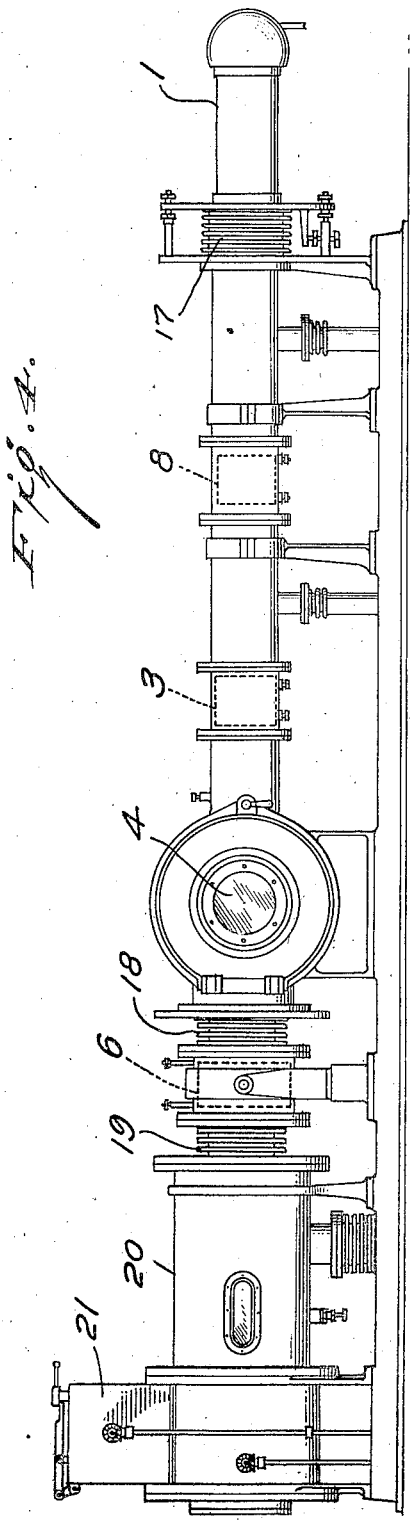
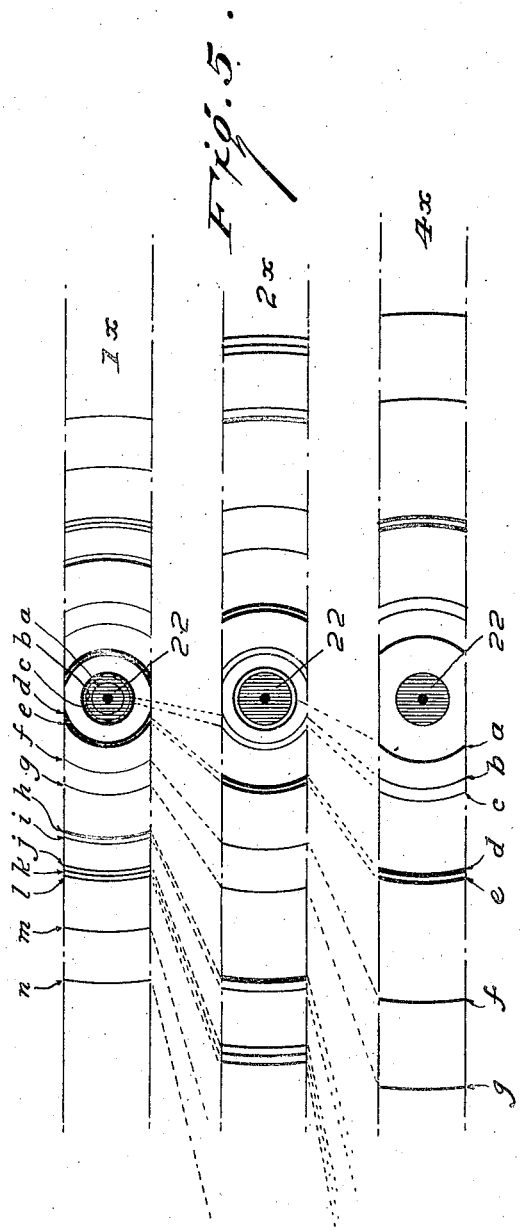
INVENTORS
GERALD L. SIMARD,
CHARLES R. STRYKER,
BY
ATTORNEY Patented Dec. 21, 1948

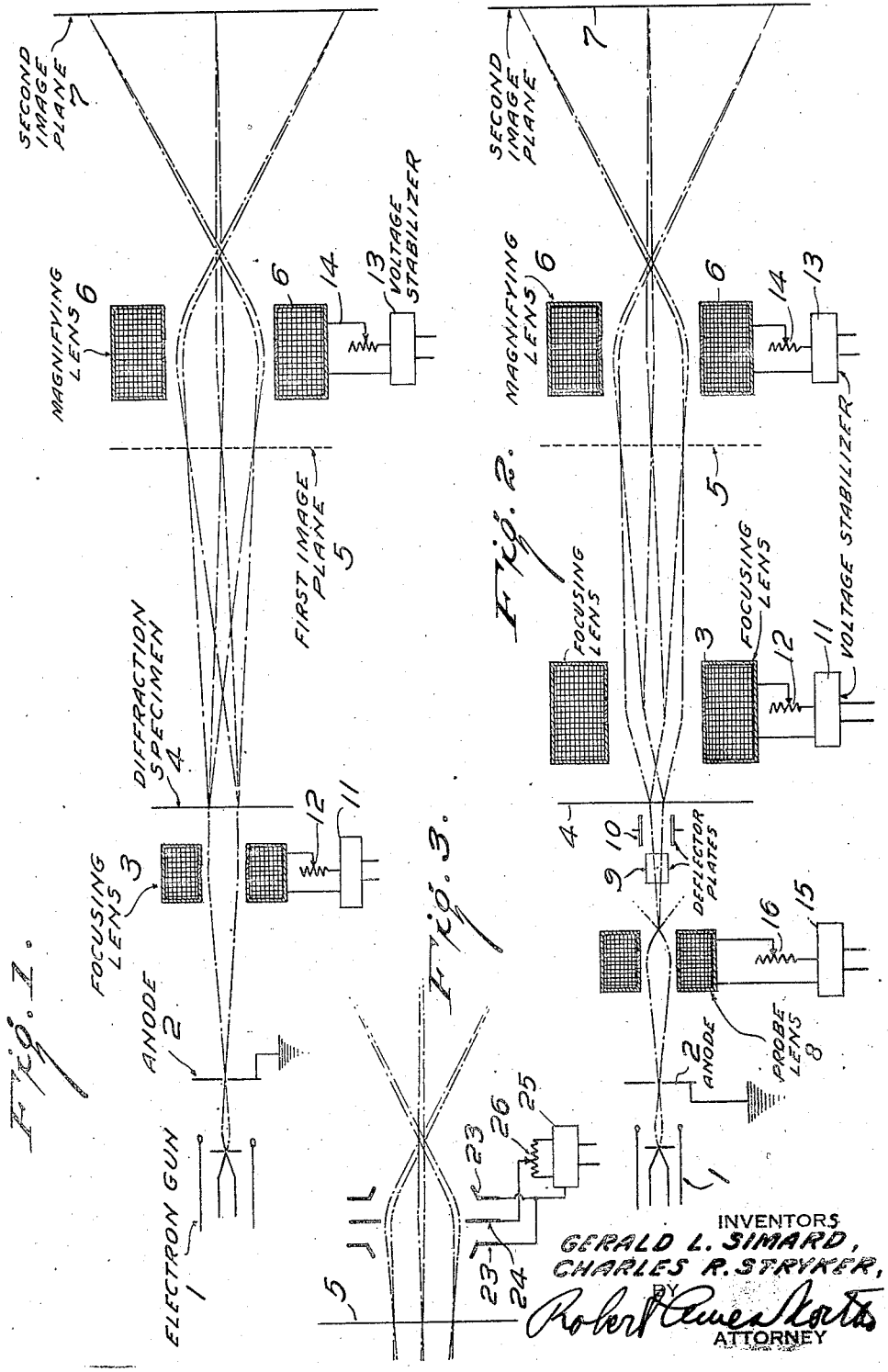

2,457,092

UNITED STATES PATENT OFFICE 2,457,092

METHOD AND APPARATUS FOR PRODUCING ELECTRON DIFFRACTION SPECTRA

Gerald L. Simard, Stamford, and Charles R. Stryker, Greenwich, Conn., assignors to American Cyanamid Company, New York, N. Y., a corporation of Maine Application April 17, 1945, Serial No. 588,738

6 Claims. (Cl. 250—49.5)

This invention relates to an improved method of obtaining and recording electron diffraction spectra and to improved apparatus for carrying out the process.

When a substantially monochromatic electron beam is passed through or reflected from suitable crystalline material the planes in the crystal lattice diffract the beam and produce a pattern which is similar and analogous to the spectra produced when polychromatic radiant energy is reflected from the suitable grating. The diffraction patterns will therefore be referred to in the present case as a diffraction spectra, the term being used in this broader sense even though the radiation is substantially monochromatic.

Electron beams, which under suitable circumstances obey optical laws, have given rise to a new science of electron optics. Such electron beams are not only capable of use in microscopy but they are also useful for other electron optical purposes. Thus, for example, when an electron beam encounters a series of oriented planes or edges with a spacing of an order of magnitude not too much greater than that of the wave length of the beam itself, the electrons are diffracted, just as is the case with ordinary light encountering rule gratings or small optical elements. In the case of the electron beam the wave length is such that the spacing of crystal lattices or the spacings between atoms in molecules of vaporized materials is of correct order of magnitude to produce diffraction. In the case of crystalline materials, diffraction may take place by transmission through very thin films of the order of magnitude of one-tenth of a micron, or less, or by the surface of a sample which is set for grazing incidence to the electron beam. For vapors, diffraction occurs in a jet of vapor flowing at right angle to the electron beam. Several investigators have described electron diffraction cameras which photograph the diffraction spectrum produced.

The procedure of photographing electron diffraction spectra has, however, been subject to some definite limitations, which have restricted its usefulness to crystals having certain maximum lattice spacings, and has made it impossible to investigate many crystalline materials, such as for example, a large number of organic substances. In the past, therefore, the process of investigating material by electron diffraction spectra has been limited to inorganic crystals and very few organic crystals.

In discussing the limitations and possibilities of the methods and apparatus for photographing electron diffraction spectra which have been used in the past, the discussion will deal as a typical illustration with diffraction spectra produced by transmission through a very thin polycrystalline sample. The spectra produced in these cases are somewhat simpler and the improvements obtained by the use of the present invention can be more clearly set forth. It should be understood, however, that exactly the same limitations apply to the somewhat more complex problem of electron diffraction spectra produced by materials possessing various degrees of preferred orientation and to reflection from the surface of a sample at grazing incidence and everything which is said with respect to the transmission by polycrystalline samples is applicable to these others.

In an ordinary electron diffraction camera as has been hitherto used the beams of electrons from the conventional electron gun are collimated or focused and passed through the transmission sample. Diffraction causes dispersion into a series of concentric rings, which can be photographed by a photographic plate, the plane of which is at right angles to the electron beam, or otherwise recorded. A focusing lens of low convergence to sharpen the definition of the lines of the spectrum has been used successfully.

A serious limitation immediately arises when electron diffraction spectrum are photographed in the ordinary way with the usual apparatus. The diffraction spectrum consists of a series of concentric rings, in the case of a transmission sample. The position of the rings on the photographic plate, that is to say, their diameters, is an inverse function of the spacing of the planes in the crystal lattice which produce the diffraction. Unfortunately, the function is not a linear one. As the spacing of the crystal lattice increases, the size and separation of the diffraction rings in the usual photograph become so small that accurate measurement of their diameter and their spacing from each other is not feasible.

The same phenomenon of rapidly decreasing ring diameter with increased lattice spacing also contributes to a further limitation on the usefulness of an electron diffraction camera of usual design. Only a portion of the energy of the electron beam is contained in the diffracted rays, the remainder of the beam, and in most cases the major portion thereof, passes through undiffracted. This beam, which is of high intensity, produces a very black central spot on the photographic plate. The size of the central spot depends to a considerable extent on the sharpness with which the image of the diffraction spectrum is focused on the photographic plate. With high quality of electron optical design it is possible to reduce the size of the central spot. However, it always remains of finite size because the electron beam itself must be of finite size in order to include sufficient energy to produce diffraction spectra capable of being automatically photographed. This results in the central spot extending over a considerably larger area than the physical dimensions of the undiffracted electron beam because of the common phenomenon of halation in photographic emulsions, and also because of scattering in the emulsion itself, which is not optically homogeneous. There is thus produced on the photographic plate a central black spot with gray fringes, and where the optics are not perfect the blackening may extend in the form of a spot of considerable diameter, which often exceeds the diameter of the electron diffraction spectra rings from lattice spacings greater than 5 A°. Such rings are not perceptible at all on the photographic plate.

The first limitation imposed by the rapidly decreasing size and dispersion of diffraction spectra with increased lattice spacing is perhaps the more serious of the two, as actual masking of the rings by a central black spot is not a final limitation with high quality optics, because rings which are just susceptible beyond the black spot will normally be too indistinct for accurate measurement. For example, a doublet ring very close to the center of the spectrum may appear as a single ring due to lack of dispersion in the electron optical system, or even with sufficient dispersion due to halation, because, of course, halation takes places in the rings just as it does in the central spot and the photograph of a diffraction ring appears, therefore, as a much wider line than is actually the case. Closely spaced rings may therefore merge into each other and appear as a single broader band. As the exact identification and measurement of the diffraction rings is one of the most important uses of the diffraction spectra this limitation has made it impractical to use electron diffraction spectra for the investigation of materials having crystal lattice spacings greater than about 5 Ångstroms. When the spacings are greater than about 10 Ångstroms, even with good quality optics, the rings will not be visible at all because they will be masked by the central black spot.

The above limitations have excluded an important class of compounds from examination by electron diffraction spectra. Many crystals, and particularly a large number of crystalline organic materials, have a lattice spacing in excess of 5 Ångstroms, and in many cases between 10 and 20 Ångstroms. Some crystals have linear spacing as great as 30 and even 40 Ångstroms.

The linear spacing of the rings on the photographic plate is, of course, equal to the tangent of the angle of divergence of the rays multiplied by the distance of the plate from the spectrum. With perfect optics the size of the central black spot should remain constant, and even with imperfect optics its size is only slightly greater when the distance of the plate from the specimen is increased. Therefore we first directed our attention to the possibility of recording rings from crystals having a greater linear spacing than 5 Ångstroms by largely increasing the distance of the plate from the specimen. This should theoretically permit producing rings of much larger diameter. However, mechanical and optical calculations and experiments showed that this method of solution is not practicable. Great increase in the path length of the electron beam increases scattering due to residual air molecules. For the same quality of image this requires a higher vacuum in the instrument, but any great increase in size of the apparatus, particularly in its length, makes the problem of exhaustion and maintenance of vacuum more difficult. The two factors aggravate each other and soon make any increase in path length practically uneconomical. This is especially true with paths lengths of more than one meter, which represents close to the maximum for economical operation.

According to the present invention we introduced between the specimen and photographic plate in any design of an electron diffraction camera a lens capable of magnifying the image on the photographic plate to any desired degree consistent with the correction of the lens. For practical purposes the lens will not need to be corrected for a total magnification of more than 20 times, and for many uses much lower magnifications will give satisfactory results. A 16 fold total magnification with the present normal size of an electron diffraction camera will bring rings from lattice spacings up to a maximum of 40 Å. out of the central spot. This represents about the extreme limits of electron diffraction work because when the lattice spacing is any greater the number of lattice planes encountered becomes low for sharp and reliable diffraction, and crystal imperfections and other variable factors make the practical use of the diffraction spectrum method largely inapplicable to wider spacings. However, the majority of crystalline organic compounds lending themselves to investigation will not have crystal lattices more than 30 Å. and for this practical range lower magnifications are usually preferred.

The relatively enormous increase in diffraction ring spacing and size which is possible by means of the present invention permits accurate identification and measurement of rings produced by crystal lattices up to the maximum spacing susceptible to diffraction measurement. The usefulness of the electron diffraction camera is therefore extended to a whole new field of substances, such as many organic crystals which had hitherto been beyond the capabilities of the instrument. The benefits of the diffraction camera as a research tool are now made available for the solution of many important new problems, particularly in organic chemistry.

The high dispersion also permits investigation of certain inorganic substances which were hitherto beyond the powers of the ordinary diffraction camera. Notably, studies in solid solubilities require pattern measurements for which the dispersion in the ordinary instrument is inadequate.

The important advantages obtained with the present invention do not entail any great increase in cost of apparatus or complexity. Electron diffraction cameras increase in cost rapidly with increase in size. The present invention permits using diffraction cameras of standard sizes, and even diffraction cameras with materially shortened specimen to plate distance, which permit cheaper and lighter instruments. About the only added element is an additional electron lens which does not greatly increase the cost of the instrument and which in no way adversely affects its ease and reliability of operation.

It is a further advantage of the process of the present invention and of instruments embodying its features, that standard elements of electron optics may be used for most of the steps of the process or elements of apparatus. Thus, for example, electron guns of conventional design are applicable. It is possible to use ordinary focusing lenses in the gun of a type which have been employed in other electron optical instruments. Such lenses produce a focused beam and the sharpness of imaging is dependent on lens characteristics. The present process in one of its modifications involves a modified portion of the beam producing elements. Instead of merely focusing an electron beam in the gun a lens may be inserted beyond the gun apertures and operated at a short focal length under conditions of reduced magnification in order to converge the beam to a sharp point, thus making it possible to use larger apertures on the gun and corresponding electron beams of greater energy. Such a lens will be referred to as probe lens in contra distinction to the standard focusing lens. The operation of this lens may be effected to produce a beam source at various points between the lens and the specimen. It is even possible to have the beam come almost to a point on the specimen so that single large crystals may be investigated where the perfection of the crystal is such as to permit this type of investigation. The use of a probe lens does not require a new design of lenses. It is merely a question of operating the lens at the required focal length with respect to its geometrical relationship to specimen and gun aperture. In such a lens, if desired, the construction may be slightly varied to obtain best operation under the particular settings employed. However, it is an advantage of the invention that this does not involve any departure from good electron lens construction.

The magnification of the spectrum image which is effected by the present invention does not change the process with regard to image focusing which has hitherto been used in electron diffraction work. In other words, a low power focusing lens may or may not be used, depending on whether the additional sharpness of the spectral rings is considered worthwhile. It is an advantage of the present invention that the knowledge and experience in this part of the process is applicable to the improved process and apparatus of the present invention.

If desired, means may be provided for moving the beam in the plane of the specimen. Such beam moving means are not unknown in electron optics, being the conventional vertical and horizontal electrostatic deflection plates which are to be seen in any cathode ray tube. It is, however, not always standard practice to move the beam in an electron diffraction camera. In any event, of course, the beam must not be moved to a point where the quality of final image on the photographic plate is too seriously affected.

The mount of the specimen involves no departure from the considerations desirable in ordinary electron diffraction cameras. It is an advantage of the present invention that the great improvement introduced by magnification of the image on the plate does not alter specimen mounting requirements and specimen mounts with the desired degrees of freedom which are useful in ordinary electron diffraction cameras may be employed in this portion of instruments operating under the process of the present invention.

The magnifying lens itself may be of any suitable type. For example, it may be a magnetic lens with or without provision for wide variation of focal length by changes in current, pole piece shapes, and the like. It is also possible to use electrostatic lenses and these latter, although posing the inherent disadvantages of electrostatic lenses as compared with magnetic lenses, do have one advantage which is not exhibited by magnetic lenses in other types of electron optics. The electrostatic lens does not rotate the image, whereas a simple single magnetic lens does. This is an advantage particularly with spectra of oriented crystallites, and if the same advantage is desired in a magnetic lens, a suitable designed oppositely wound, double magnetic lens would be needed. From this standpoint an electrostatic lens presents some advantage in the present process. Of course it has the usual disadvantages of high voltage, sensitivity to dust particles, etc. In general the process of the present invention is not limited to particular designs of lenses and properly constructed magnetic or electrostatic lenses may be used in the process at the points where lenses enter into the optics. For practical instruments there is some advantage in an instrument using magnetic lenses through out, though this is obtained at the cost of very closely regulated power supplies for the individual lenses, and the use of a single power supply for electron gun and lenses which is possible with an all electrostatic setup is not enjoyed.

As pointed out above the magnification of the image on the photographic plate is useful in resolving doublet rings and increasing the accuracy in similar diffraction effects which show a measurement of crystal spacings and structure. For this reason it is desirable to correct the magnifying lens as far as possible for aberrations, particularly spherical and chromatic aberrations. However, this magnifying lens is not too critical and ordinary designs may be used, depending on the quality of image desired.

As has been brought out above, it is desirable to provide a three lens instrument or to operate a process using three focusing operations. The lens focusing the diffraction spectrum onto a plane in front of the magnifying lens may be omitted, but for best results its presence is desirable. When three lenses are used it is possible to design the instrument so that it can be operated either as an electron diffraction instrument or as electron microscope. The processes are different. They require different currents if magnetic lenses are used or different potentials if electrostatic lenses are used, but for some purposes it is desirable to design an instrument capable of interchangeable use as a diffraction camera and electron microscope. It is an advantage of the present invention that this is possible with one of the modifications. In general where much diffraction work is to be undertaken it is desirable to design an instrument for diffraction spectra work only. The compromise instrument is not ideal for both diffraction work and microscopy and is only of value where it is not practical to have two specialized instruments.

As has been pointed out above any ordinary type of electron optical lens may be used, regardless of whether it is a magnetic or an electrostatic lens. Both of these types are electrically actuated, one being responsive to current and the other to voltage. In the claims, therefore, the generic term "electric lens" will be used to cover either a magnetic or an electrostatic lens, and it should be understood that this term is used in the claims in no other sense.

The invention will be described in greater detail in conjunction with the drawing in which:

Fig. 1 is a diagram of a two lens electron diffraction camera;

Fig. 2 is a similar diagram of a three lens electron diffraction camera;

Fig. 3 is a detail of an electrostatic magnifying lens; and

Fig. 4 is an elevation of a camera constructed according to diagram of Fig. 2, and Fig. 5 is a diagram of three negatives of electron diffraction spectra.

Fig. 1 shows, in diagrammatic form, a simple electron diffraction camera using two lenses and embodying the process and apparatus features of the present invention. The usual electron gun is shown at 1 with a grounded anode 2. The electron beam passes through a focusing lens 3 to strike a diffraction specimen shown at 4. The beam in passing through or being reflected from the specimen produces a diffraction spectrum which is focused by the lens 3 at the first image plane 5. This is followed by a magnifying lens 6 which produces an enlarged image of the spectrum on the second image plane 7.

The focusing lens 3 is supplied from a source of stabilized voltage 11, its current being controlled by the rheostat 12. In a similar manner, the magnifying lens 6 is supplied from a voltage stabilizer 13 through the rheostat 14.

The magnetic lenses 3 and 6 are shown in diagrammatic form. The current through the lens 3 is comparatively small as this lens does not converge strongly, serving only to focus the diffraction spectrum on the first image plane 5.

Comparing the diagram of Fig. 1 with the usual electron diffraction camera, the usual construction might be considered to end at the first image plane 5. Another way to look at the difference is to consider the magnifying lens 6 as rendered inoperative by cutting off the current and adjusting the current of the focusing lens 3 to focus the spectrum on the plane 7. In either case, a comparatively low degree of dispersion is produced.

A somewhat more elaborate three lens system is shown in Fig. 2, the same elements bearing the same reference numerals. The beam from the electron gun leaving the anode 2 passes through a magnetic probe lens 8. This converges the beam to a point source, the beam then passing through two pairs of deflection plates 9 and 10, supplied with adjustable high voltage in the customary manner. These deflection plates permit accurate centering of the beam on the diffraction specimen 4.

The rays from the diffraction specimen which form the diffraction spectrum pass through the focusing lens 3 which images the spectrum on the first image plane 5 as in Fig. 1, and the magnetic lens 6 then operates in the same manner as in Fig. 1 to produce an enlarged image of the spectrum on the plane 7.

The operation of the three lens camera of Fig. 2 is not materially different in nature than that of the two lens camera in Fig. 1, the position of the focusing lens 3 being optional as the same results are obtained whether it is mounted before or after the specimen provided its current is suitably regulated. The probe lens 8, however, permits producing the beam from a smaller source which can be regulated in accordance with the particular conditions of operation. This is important where great magnification is used as it makes narrower and sharper spectral lines possible.

Fig. 4 shows an actual mounting for a diffraction camera, the various parts of the diagram of Fig. 2 being identified by their reference numerals. It will be noted that the electron gun is connected to the camera by Sylphon bellows 17. Similarly, the magnifying lens 6 is shown as mounted between two Sylphon bellows 18 and 19 which permit correct centering of the lens and vacuum tight connection to the recording chamber 20 which is provided with an enlargement 21 housing a photographic plate holder.

The focusing lens 3 is shown in front of the diffraction specimen as in Fig. 1 rather than behind it as in Fig. 2. As the position is optional, the results obtained are the same. Changes in magnification by magnifying lens 6 are obtained by changing the focal length of the lens through variation of the current therethrough; but in such a case, it will also be necessary to make a change in the location of the first image plane 5 which may be effected by a suitable adjustment of the current through the focusing lens 3.

The design of camera shown in Figs. 1 to 4 uses magnetic lenses which are preferred as they operate at lower voltages and present some advantages described in the general portion of the specification. Electrostatic lenses may replace part or all of magnetic lenses, the operation and design of the camera remaining unchanged.

Fig. 3 is a detail of a portion of Fig. 2 from the first image plane 5 through the lens and illustrates the use of a typical electrostatic lens. This lens is shown in the form of a well corrected doublet with two grounded plates 23 and a central plate 24 supplied with negative high voltage from the voltage source 25 through the potentiometer 26. Variation of the voltage on the negative plate 24 changes the focal length of the lens in a manner similar to the change of focal length by variation of current in the magnetic lens 6. The operation of the camera is the same as with a magnetic lens and in a similar manner the other lenses 3 and 8 may be replaced by electrostatic lenses, if desired.

Fig. 5 illustrates a series of three photographic negatives of the same electron diffraction spectrum at different magnifications which are shown at the right hand side. As photographic negatives of electron diffraction spectra show hazy background and similar characters which are unsuitable for accurate representation in line drawing the spectrum shown in Fig. 5 is drawn as an idealized spectrum from a transmission sample showing only the rings and central spot. The central spot appears at 22 and is of substantially the same size regardless of magnification. A series of rings from $a$ to $n$ are shown some of which, $d$ and $e$, are in the form of a difficultly resolvable doublet. It will be seen that in the top spectrum lines $a$ and $b$ can not be seen at all, and line $c$ is so close to the central spot as to make identification difficult and accurate measurement impossible. The lines $d$ and $e$ appear as a single wider line because of halation and other factors which operate to prevent identification of these lines as a doublet with the low dispersion obtaining in the first spectrogram. Lines $f$ and $g$ are easily seen but are rather small and present some difficulty in precise measurement. Lines $h$ to $n$ can be easily seen and particularly lines $l$ and $m$ are best studied on a spectrogram showing the dispersion which corresponds to a diffraction camera without magnification.

The middle spectrogram shows what happens when the lens 6 is operated to produce a magnification of two diameters. Here lines $b$ and $c$ become clearly visible outside the central spot while $a$ is not readily discernible, and incapable of measurement. Lines $d$ and $e$ appear as a doublet but the separation is still not adequate. Line $f$ to $k$ are well spaced and particularly the lines $h$ to $l$ can be very accurately measured. Lines $m$ and $n$ have been moved outside of the field of the spectrogram.

The bottom spectrogram illustrates a further doubling of magnification presenting the total magnification of four diameters. Here line $a$ becomes clearly identifiable although not of sufficient dispersion for maximum accuracy in measurement; $b$ and $c$ are well separated and while somewhat small in diameter are useful; $d$ and $e$ are now clearly a doublet and can be measured accurately as can $f$ and $g$ which are of such size that a very accurate determination of their spacing is possible. Lines $h$ to $l$ have moved outside of the field of the spectrogram.

Fig. 5 illustrates in a typical, though idealized form, the improvements which can be observed in actual spectrograms obtained in electron diffraction cameras employing the process and apparatus of the present invention. The figure with fourfold magnification does not by any means limit the point of useful dispersion, in fact the lines $a$ to $e$ could profitably be studied at even high dispersion for example, with the six to eight fold magnification. This dispersion would be almost sufficient for accurate measurement of line $a$. Still larger magnification would be needed only with substances which produce sharp lines of much smaller diameter than ring $a$.

The spectrograms of Fig. 5 have been presented in somewhat idealized form and for clarity transmission spectra have been illustrated. The improved dispersion obtainable by the present invention is equally necessary with diffraction spectra which produce spectrograms of more complicated form but do not lend themselves as readily to diagrammatic representation.

We claim:

1. A process of producing images of electron diffraction spectra form which crystal interplanar spacings can be measured which comprises producing an electron beam of predetermined convergent, divergent or parallel characteristics and of suitable wave length for diffraction spectral work, causing said beam to impinge on a sample, the electron diffraction spectrum of which is to be measured, subjecting the undiffracted beam and the divergent diffracted rays to electron optical magnification not exceeding 20 diameters and through a field stop sufficiently large to pass a large portion of an electron diffraction pattern to produce a magnified image of the diffracted rays on a predetermined plane.

2. A process of producing images of electron diffraction spectra from which crystal interplanar spacings can be measured which comprises producing an electron beam of predetermined convergent, divergent or parallel characteristics and of suitable wave length for diffraction spectral work, causing said beam to impinge on a sample, the electron diffraction spectrum of which is to be measured, focusing the rays forming the electron diffraction spectrum onto a plane, and producing an enlarged image of said spectrum onto a second plane by electron optical magnification not exceeding 20 diameters and through a field stop sufficiently large to pass a large portion of an electron diffraction pattern.

3. A process of producing images of electron diffraction spectra from which crystal interplanar spacings can be measured which comprises producing an electron beam of predetermined convergent characteristics and of suitable wave length for diffraction spectral work, causing said beam to impinge on a sample, the electron diffraction spectrum of which is to be measured, subjecting the undiffracted beam and the divergent diffracted rays to electron optical magnification not exceeding 20 diameters and through a field stop sufficiently large to pass a large portion of an electron diffraction pattern to produce a magnified image of the diffracted rays on a predetermined plane.

4. A process of producing images of electron diffraction spectra from which crystal interplanar spacings can be measured which comprises producing an electron beam of predetermined convergent, characteristics and of suitable wave length for diffraction spectral work, causing said beam to impinge on a sample, the electron diffraction spectrum of which is to be measured, focusing the ways form the electron diffraction spectrum onto a plane, and producing an enlarged image of said spectra onto a second plane by electron optical magnification not exceeding 20 diameters and through a field stop sufficiently large to pass a large portion of an electron diffraction pattern.

5. A process according to claim 1 in which the electronic beam is passed through a magnetic lens and the electronic magnification of the diffraction spectra images is effected by a magnetic lens the focal length of which, and hence its magnification, is varied by variation of electric current flowing therethrough.

6. A process according to claim 2 in which all the electronic lenses are magnetic lenses and the current through the lens magnifying the diffraction spectra images and the focusing lens is varied to produce images of varying size in sharp focus on the second plane.

GERALD L. SIMARD.
CHARLES R. STRYKER.

REFERENCES CITED

The following references are of record in the file of this patent:

UNITED STATES PATENTS

| Number | Name | Date |
| --- | --- | --- |
| 2,170,663 | Painter | Aug. 22, 1939 |
| 2,233,264 | Marton | Feb. 25, 1941 |
| 2,281,325 | Ramo | Apr. 28, 1942 |

OTHER REFERENCES

"Journal of Scientific Instruments," vol. 14 (1937), pp. 14–24. (Copy in Div. 54.)

"Electron Optics," Meyer's, pp. 444–446, D. Van Nostrand Co., Inc., 1939. (Copy in Div. 54.)

Alexanders' Colloid Chemistry, vol. V, published by Reinhold Publishing Co., preface dated Jan. 1944; pp. 152–181.

"Electron Optics and the Electron Microscope," by Zworykin, Morton, Ramberg, Hillier and Vance, published by J. Wiley and Sons Inc., 1945, (copy in Div. 54), pp. 156, lines 1–3 and pages 272-273).

"New Electronic Tool—Dr. Prebus' Camera," article published in the Ohio State University Monthly for Nov. 1943, pp. 16 and 17.

Certificate of Correction

Patent No. 2,457,092.

December 21, 1948.

GERALD L. SIMARD ET AL.

It is hereby certified that errors appear in the printed specification of the above numbered patent requiring correction as follows:

Column 9, line 50, claim 1, for the word "form" read *from*; column 10, line 27, claim 4, for "ways form" read *rays forming*; and that the said Letters Patent should be read with these corrections therein that the same may conform to the record of the case in the Patent Office.

Signed and sealed this 30th day of August, A. D. 1949.

[SEAL]

THOMAS F. MURPHY,
*Assistant Commissioner of Patents.*